(12) United States Patent
Cunningham et al.

(10) Patent No.: US 7,735,017 B2
(45) Date of Patent: *Jun. 8, 2010

(54) SYSTEM AND METHOD FOR AUTOMATING MANUAL TRANSACTIONS BETWEEN DISJOINT SYSTEMS

(75) Inventors: Bruce R. Cunningham, Berthoud, CO (US); Scott D. Hicks, Underhill Center, VT (US); James A. Martin, Jr., Endicott, NY (US); Diane C. Rauch, Williston, VT (US); Jamie P. Rigoni, Fairfax, VT (US)

(73) Assignee: International Business Machines Corporation, Armonk, NY (US)

( * ) Notice: Subject to any disclaimer, the term of this patent is extended or adjusted under 35 U.S.C. 154(b) by 976 days.

This patent is subject to a terminal disclaimer.

(21) Appl. No.: 11/062,366

(22) Filed: Feb. 22, 2005

(65) Prior Publication Data

US 2006/0190835 A1  Aug. 24, 2006

(51) Int. Cl.
*G06F 3/048* (2006.01)
*G06F 3/00* (2006.01)
(52) U.S. Cl. ............... 715/770; 715/225; 715/764; 715/769; 715/780; 715/804; 719/329
(58) Field of Classification Search .......... 715/770
See application file for complete search history.

(56) References Cited

U.S. PATENT DOCUMENTS

| | | | | |
|---|---|---|---|---|
| 5,237,628 A | * | 8/1993 | Levitan | 382/175 |
| 5,606,674 A | * | 2/1997 | Root | 715/769 |
| 5,625,809 A | * | 4/1997 | Dysart et al. | 707/103 R |
| 6,177,939 B1 | * | 1/2001 | Blish et al. | 715/770 |
| 6,249,283 B1 | * | 6/2001 | Ur | 715/764 |
| 6,925,308 B2 | * | 8/2005 | Goldsmith et al. | 455/466 |
| 6,944,821 B1 | * | 9/2005 | Bates et al. | 715/209 |
| 7,310,781 B2 | * | 12/2007 | Chen et al. | 715/769 |
| 2004/0250215 A1 | * | 12/2004 | Chen et al. | 715/769 |
| 2006/0075353 A1 | * | 4/2006 | DeSpain et al. | 715/770 |

FOREIGN PATENT DOCUMENTS

EP    0 520 768 B1    8/2000

OTHER PUBLICATIONS

System3 POS, Jan. 31, 2005, http://web.archive.org/web/20050131190840/http://www.system3pos.com/Manuals/LabourSchedule.doc.*

* cited by examiner

*Primary Examiner*—Kieu Vu
*Assistant Examiner*—Yongjia Pan
(74) *Attorney, Agent, or Firm*—Anna Linne; Hoffman Warnick LLC

(57) ABSTRACT

A system, method and program product for copying data between disjoint data processing applications. A system is disclosed that includes: a source application having a system for selecting a data record and a triggering agent that extracts relevant data from the selected data record, launches a dialog box and displays the extracted relevant data in the dialog box; and a data transfer system having a keystroke simulator for copying and pasting data from the dialog box to an interface window in a target application based on a set of data transfer rules.

15 Claims, 3 Drawing Sheets

SYSTEM AND METHOD FOR AUTOMATING MANUAL TRANSACTIONS BETWEEN DISJOINT SYSTEMS

BACKGROUND OF THE INVENTION

1. Technical Field

The present invention relates generally to sharing data among data processing applications, and more specifically relates to a system and method for transferring data from a source database application to a target database application.

2. Related Art

In large enterprise based organizations, the same information often needs to captured in multiple data processing applications. For example, employees may need to enter and track their time in both a time and billing application and a project management application. In many situations, the different applications are disjoint in that no backend programming interface can be implemented to automatically update the data in one system with data in the other.

In these situations, users are forced to manually enter the same data into both systems. Not only is this process tedious for the user, it is also an inefficient use of the user's time and is prone to errors. Accordingly, a need exists for an automated system that can automate manual transactions, such as transferring data, between disjoint systems.

SUMMARY OF THE INVENTION

The present invention addresses the above-mentioned problems, as well as others, by providing a system, method and program product that automates manual transactions between disjoint systems. In a first aspect, the invention provides a system for copying data between disjoint applications, comprising: a source application having a system for selecting a data record and a triggering agent that extracts relevant data from the selected data record, launches a dialog box and displays the extracted relevant data in the dialog box; and a data transfer system having a keystroke simulator for copying and pasting data from the dialog box to an interface window in a target application based on a set of data transfer rules.

In a second aspect, the invention provides a program product stored on a computer readable medium for copying data between disjoint applications, comprising: program code configured for allowing a data record to be selected; program code configured for extracting relevant data from the selected data record, launching a dialog box and displaying the extracted relevant data in the dialog box; and program code configured for copying and pasting data from the dialog box to an interface window in a target application based on a set of data transfer rules.

In a third aspect, the invention provides a method of copying data between disjoint applications, comprising: selecting a data record in a source application; extracting data from the data record; launching a dialog box; displaying the extracted data in the dialog box; displaying a target application window; and copying and pasting the extracted data into the target application window in accordance with a set of data transfer rules.

In a fourth aspect, the invention provides a method for deploying an application for copying data between disjoint data processing applications, comprising: providing a computer infrastructure being operable to: select a data record; initiate a triggering agent to extract relevant data from the selected data record, launch a dialog box and display the extracted relevant data in the dialog box; and copy and paste data from the dialog box to an interface window in a target application based on a set of data transfer rules.

In a fifth aspect, the invention provides computer software embodied in a propagated signal for copying data between disjoint data processing applications, the computer software comprising instructions to cause a computer to perform the following functions: select a data record; initiate a triggering agent to extract relevant data from the selected data record, launch a dialog box and display the extracted relevant data in the dialog box; and copy and paste data from the dialog box to an interface window in a target application based on a set of data transfer rules.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
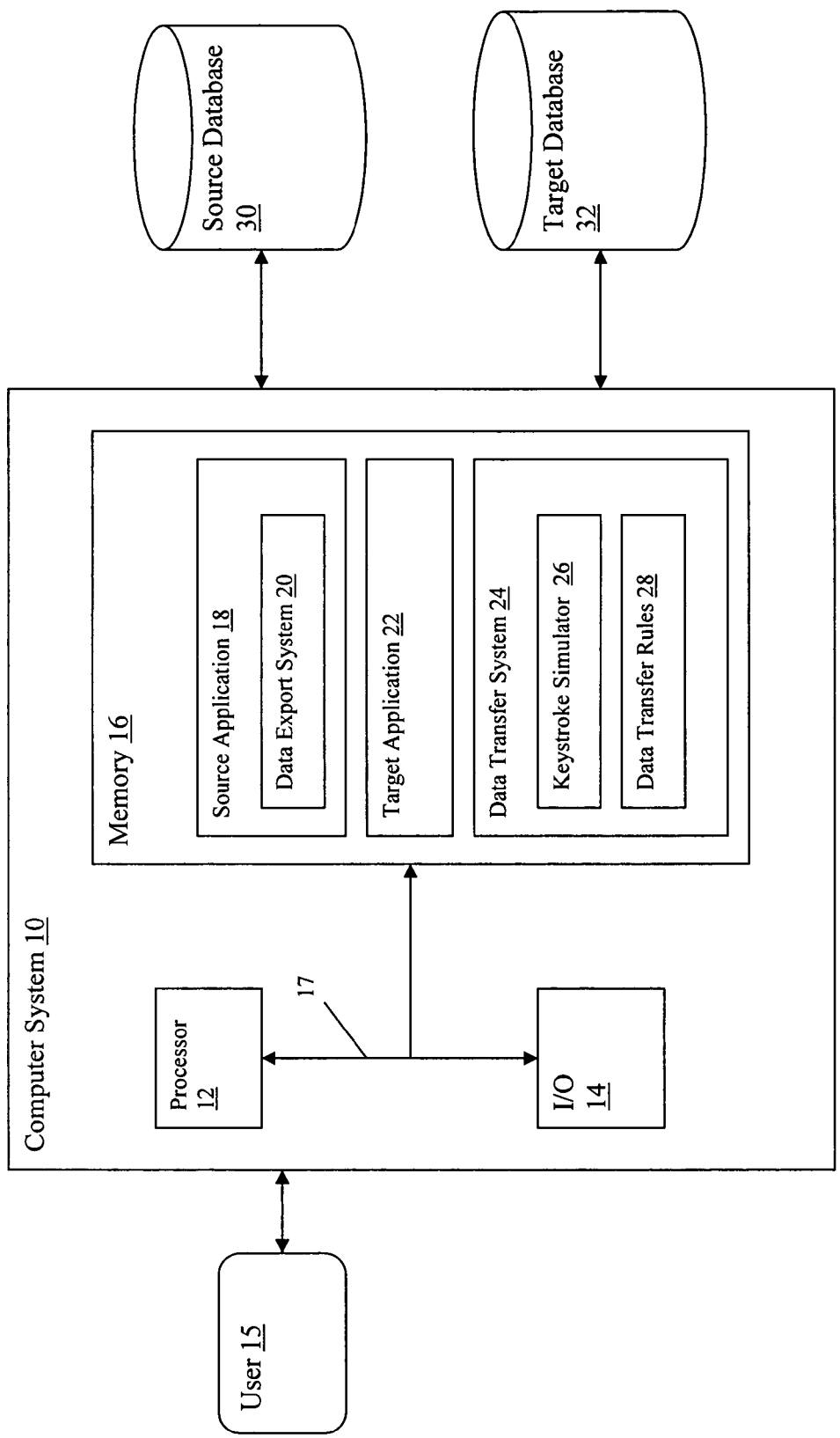
FIG. 1 depicts a computer system having a data transfer system in accordance with the present invention.

Referring now to the drawings, FIG. 1 depicts a computer system 10 having a data transfer system 24 for transferring data between disjoint applications shown as source application 18 and target application 22. It should be understood that the applications 18, 22 may comprise any type of system or systems that processes data, including but not limited to database applications. The applications 18, 22 are "disjoint" for instance because the target application 22 lacks a programming interface that allows data to be programmatically inputted as a back-end process.

Computer system 10 may comprise, e.g., a desktop, a laptop, a workstation, etc. Moreover, computer system 10 could be implemented as part of a client and/or a server. Computer system 10 generally includes a processor 12, memory 16, bus 17, input/output interfaces (I/O) 14, and various external devices and resources, such as external storage. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External resources may comprise any known type of external device, including: storage, a display, speakers, a hand-held device, keyboard, mouse, voice recognition system, speech output system, printer, facsimile, pager, etc. Bus 17 may be included to provide a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

In the example shown in FIG. 1, source application 18 has an associated set of data stored in source database 30, and target application 22 has an associated set of data stored in target database 32. Data utilized by computer system 10, such as that shown in source database 30 and target database 32, may be stored in any type of storage system (e.g., a relational database, flat file, etc.) and may include one or more storage devices, such as RAM, ROM, a magnetic disk drive and/or an optical disk drive. Data storage can also be distributed across, for example, a local area network (LAN), wide area network (WAN) or a storage area network (SAN) (not shown).

Access to computer system 10 may also be implemented over any type of network such as the Internet, a local area network (LAN), a wide area network (WAN), a virtual private network (VPN), etc. Communication may occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, communication could occur in a client-server or server-server environment.

In order to effectuate the data transfer process, a data export system 20 is integrated into the source application 18. The integration may be implemented in any fashion, e.g., programmatically, as a plug-in, etc. As described in further detail below, data export system 20 includes: (1) a mechanism that allows the user 15 to select a data record associated with the source application 18 (e.g., stored in source database 30); and (2) a triggering agent that extracts relevant data from the selected data record, launches a dialog box and displays the extracted data in the dialog box. The data transfer system 24 then utilizes a keystroke simulator 26 to perform a "copy and paste" operation of the extracted data from the dialog box into the target application 22 based on data transfer rules 28.

Figure 2:
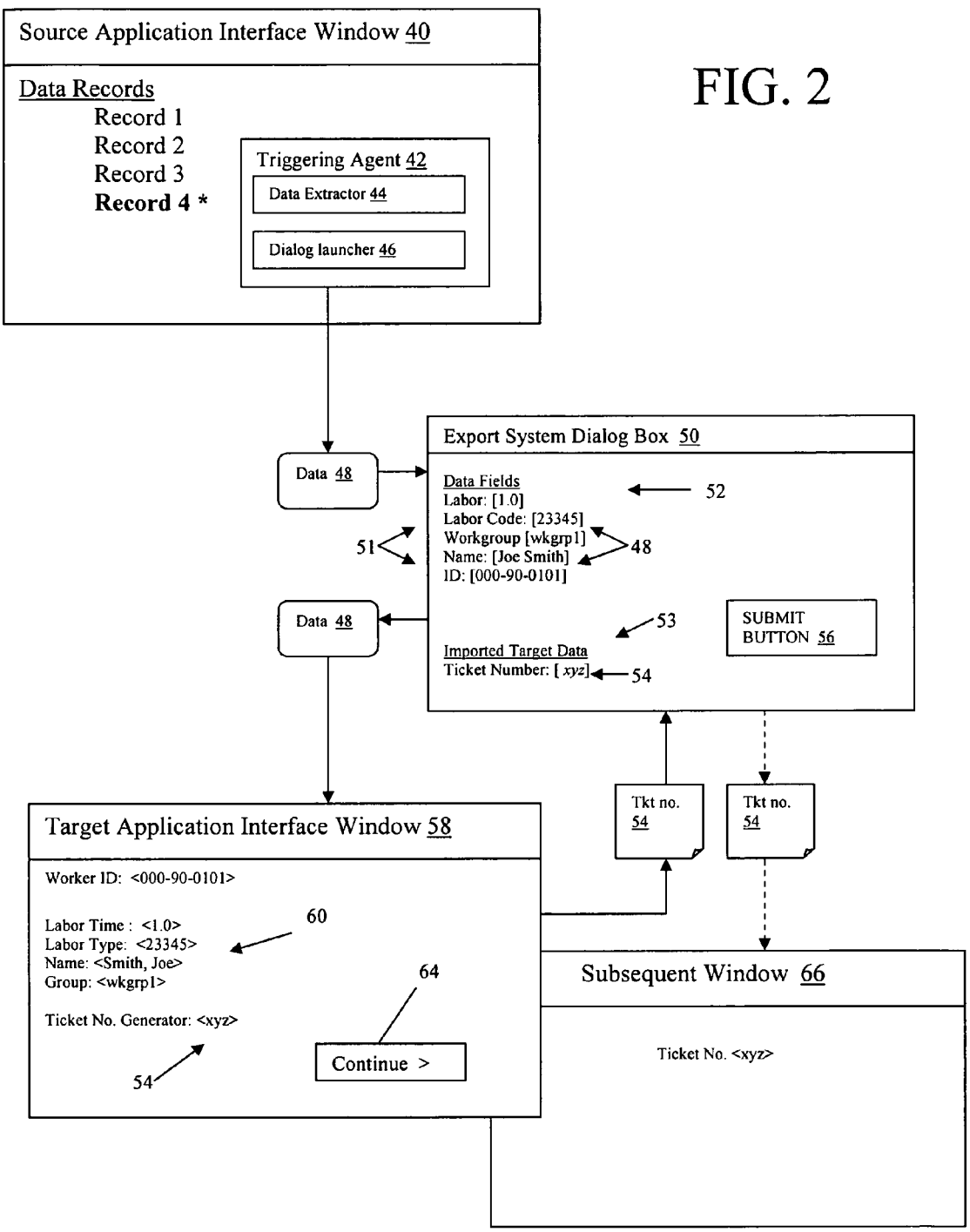
FIG. 2 depicts illustrative user interfaces for implementing a data transfer process in accordance with the present invention.

FIG. 2 shows an illustrative implementation of the data transfer process in greater detail. The process starts from a source application interface window 40, which is part of the source application 18. The user 15 first identifies and selects a data record, e.g., record 4, for transfer to the target application 22. It should be understood that term "data record" may refer to any collection of data available from the source application 18, and is not limited to any particular data structure or format. The data record may be selected using any know technique, such as with a mouse click.

The user 15 then enacts a triggering agent 42 (e.g., implemented as a button or the like in source application interface window 40), which causes data extractor 44 to collect relevant data from the data record (referred to herein as extracted relevant data or extracted data 48). Relevant data refers to any portion of the data record that is required by the target application 22. In some instances, only a portion of the data record is relevant and needs to be transferred. Triggering agent 42 also causes dialog launcher 46 to launch an export system dialog box 50, which displays data fields 52 that includes the extracted data 48 (displayed in brackets) along with associated static identifiers 51. In this case, extracted data 48 includes a value of "1.0" that is associated with the identifier "Labor," a value of "23345" that is associated with "Labor Code," etc. It should be understood that export system dialog box 50 may be implemented in any manner, e.g., as a pop-up window, framed within an existing window, etc., and display the extracted data 48 in any manner.

After the export system dialog box 50 is opened with the data fields 52 displayed, the user 15 can view and verify the extracted data 48 before furthering the data transfer process. In this example, the exported data 48 consists of time/labor tracking information, which is required for both the source application 18 and the target application 22. It should be understood however that the invention is not limited to any particular type of data.

Also shown in the export system dialog box 50 is an area 53 for storing imported target data, which in this example includes a ticket number 54. Area 53 is used to capture and temporarily store target data, which are values generated by the target application 22 that need to be reused by the target application 22 during the data transfer process. Initially, this field would be blank until after the target application 22 actually generates target data, such as ticket number 54. This process is described in further detail below.

As noted above, the user 15 can view and verify the extracted data 48 in the export system dialog box 50 before proceeding with the transfer process. Assuming the extracted data 48 is acceptable to be exported, the user 15 can select the submit button 56, which launches or brings up a target application interface window 58 from the target application 22. The keystroke simulator 26 (shown in FIG. 1) then performs a copy and paste operation, which copies the extracted data 48 from the export system dialog box 50 to the appropriate target fields 60 in the target application interface window 58 using a set of data transfer rules 28. Keystroke simulation systems that collect key stroke data (e.g., from a display to a data cache such as a clip board) and paste the data into a new location are well known in the art, and are therefore not described in further detail. Data transfer rules 28 may include any rules that map the extracted data 48 from the export system dialog box 50 to the target fields 60 in the target application interface window 58. For example, the location and order in which the data is pasted (e.g., ID first, amount of labor second, etc.); the arrangement of the data (e.g., last name first, first name last), etc., are determined by the data transfer rules 28.

In the example shown in FIG. 2, the target application 22 generates a ticket number 54 ("xyz") after the extracted data 48 is entered in the target application interface window 58. In this particular target application 22, the ticket number 54 is required in a subsequent window 66 of the target application 22 in order to complete the data input process. In order to automate the process, the ticket number 54 is temporarily stored and displayed back in the export system dialog box 50 in the imported target data area 53. Then, when the user 15 navigates to the subsequent window 66 using, e.g., the continue button 64, the ticket number 54 can be copied and pasted from the export system dialog box 50 into the subsequent window 66 using the keystroke simulator 26. Thus, user 15 is not required to re-type any of the data 48, but instead only needs to navigate through the necessary windows. It should be understood that any type of target data generated by the target application 28 may be temporarily stored and displayed in the export system dialog box 50, and that the ticket number 54 depicts just one type of target data that may be processed in this manner.

Figure 3:
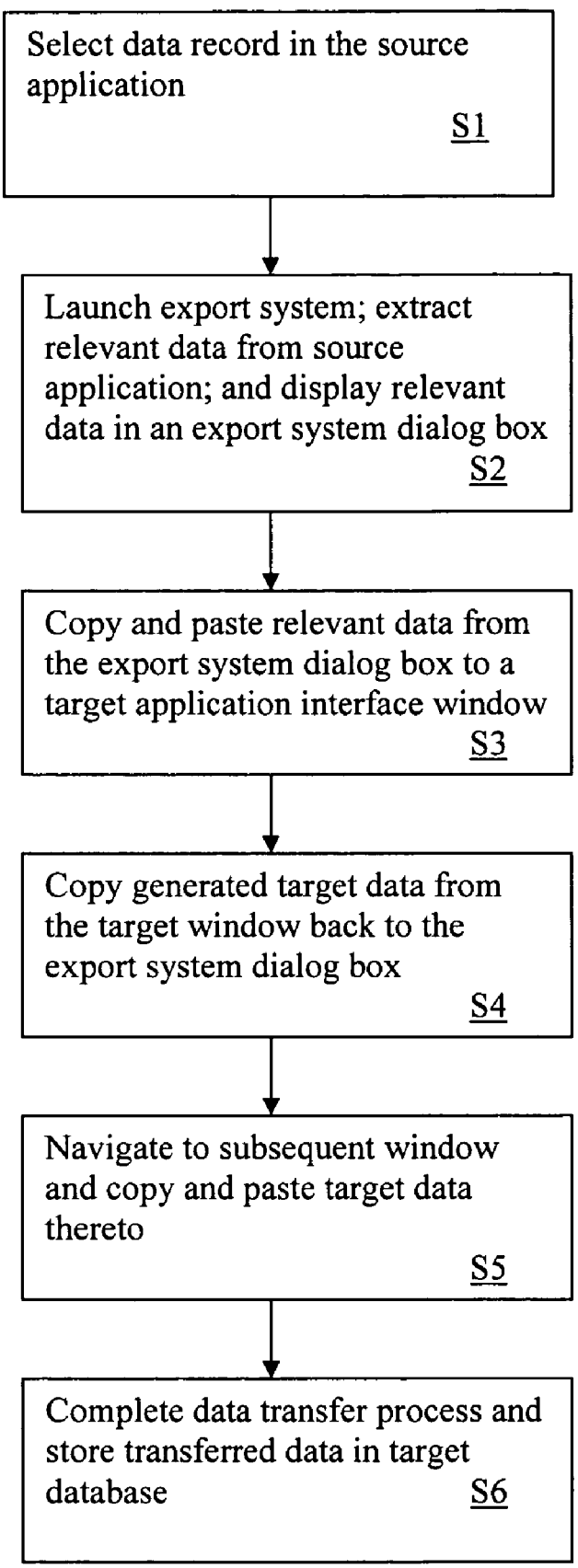
FIG. 3 depicts a flow chart showing a data transfer process in accordance with the present invention.

Referring now to FIG. 3, a flow chart depicting the data transfer process is shown. In the first step S1, the user 15 selects a data record in the source application 18. At step S2, a triggering agent 42 enacted by the user 15 launches the data export system 20 which: extracts relevant data from the selected data record stored in the source database 30; launches an export system dialog box 50; and displays the extracted data 48 to be exported in the dialog box 50. At step S3, the extracted data 48 is copied and pasted into a target application interface window 58 using a keystroke simulator 26. At step S4, target data generated by the target application 22 is copied back to the export system dialog box 50. Next, at step S5 the user 15 navigates to a subsequent target application window 66, and the target data is copied to the subsequent target application window 66. Finally, at step S7, the data transfer process is complete and the extracted data 48 is stored in the target database 32.

It should be appreciated that the features of the invention can be implemented separately from, or within from the source and target applications. It should also be appreciated that the teachings of the present invention could be offered as a business method on a subscription or fee basis. For example, a computer system 10 comprising a data transfer system 24 could be created, maintained and/or deployed by a service provider that offers the functions described herein for customers. That is, a service provider could provide an on-line mechanism for generating staffing plans as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A program product stored on a computer storage medium for copying data between disjoint applications, comprising:
   program code configured to allow a user to select a data record from a source application;
   program code configured to extract relevant data from the selected data record, launch a dialog box and display the extracted relevant data in the dialog box, wherein relevant data includes any portion of the data record required by a target application; and
   program code configured for copying and pasting data from the dialog box to an interface window in the target application based on a set of data transfer rules,
      wherein the source application and the target application are disjoint from one another,
      wherein the set of data transfer rules include rules dictating at least one of a location in which the data is pasted, an order in which the data is pasted, and an arrangement of the data, and
      wherein a ticket number is generated by the target application and associated with the relevant data, and the ticket number is used in a subsequent window of the target application in order to complete the copying data between disjoint applications.

2. The program product of claim 1, wherein the dialog box includes a field for temporarily storing target data generated by the target application.

3. The program product of claim 1, wherein the selected data record comprises time and billing data.

4. The program product of claim 1, wherein the data transfer rules provide a mapping of the data from the dialog box to the interface window in the target application.

5. A method of copying data between disjoint applications, comprising:
   selecting a data record in a source application;
   extracting data from the data record, wherein the data extracted includes any portion of the data record that is required by a target application;
   launching a dialog box;
   displaying the extracted data in the dialog box;
   displaying a target application window of the target application; and
   copying and pasting the extracted data into the target application window in accordance with a set of data transfer rules,
      wherein the source application and the target application are disjoint from one another,
      wherein the set of data transfer rules include rules dictating at least one of a location in which the data is pasted, an order in which the data is pasted, and an arrangement of the data, and
      wherein a ticket number is generated by the target application and associated with the relevant data, and the ticket number is used in a subsequent window of the target application in order to complete the copying data between disjoint applications.

6. The method of claim 5, comprising the further steps of:
   generating target data within the target application;
   copying and pasting the target data to the dialog box;
   displaying the target data in an imported target data field in the dialog box;
   navigating to a subsequent window in the target application; and
   copying and pasting the target data from the dialog box into the subsequent window.

7. The method of claim 5, wherein the extracted data record comprises time and billing data.

8. The method of claim 5, wherein the data transfer rules provide a mapping of the data from the dialog box to the target application interface window.

9. The method of claim 6, wherein the copying and pasting steps further comprise utilizing a keystroke simulator to perform a copy and paste operation of the extracted relevant data from the dialog box into the target application based on the set of data transfer rules.

10. A method for deploying an application for copying data between disjoint data processing applications, comprising:

providing a computer infrastructure being operable to:
  select a data record in a source application;
  initiate a triggering agent to extract relevant data from the selected data record,
    wherein relevant data includes any portion of the data record that is required by a target application;
  launch a dialog box and display the extracted relevant data in the dialog box; and
  copy and paste data from the dialog box to an interface window in the target application based on a set of data transfer rules,
    wherein the source application and the target application are disjoint from one another,
    wherein the set of data transfer rules include rules dictating at least one of a location in which the data is pasted, an order in which the data is pasted, and an arrangement of the data, and
    wherein a ticket number is generated by the target application and associated with the relevant data, and the ticket number is used in a subsequent window of the target application in order to complete the copying data between disjoint applications.

11. The program product of claim 1, wherein the ticket number is displayed in the dialog box.

12. The method of claim 5, wherein the ticket number is displayed in the dialog box.

13. The method of deploying of claim 10, wherein the ticket number is displayed in the dialog box.

14. The program product of claim 1, wherein the copying and pasting steps further comprise utilizing a keystroke simulator to perform a copy and paste operation of the extracted relevant data from the dialog box into the target application based on the set of data transfer rules.

15. The method of deploying of claim 10, wherein the copying and pasting steps further comprise utilizing a keystroke simulator to perform a copy and paste operation of the extracted relevant data from the dialog box into the target application based on the set of data transfer rules.

* * * * *